Oct. 8, 1940.    R. S. SANFORD    2,216,854
VEHICLE SUSPENSION SYSTEM
Filed July 3, 1936    2 Sheets-Sheet 1

Inventor
Roy S. Sanford
By N. D. Parker
Attorney

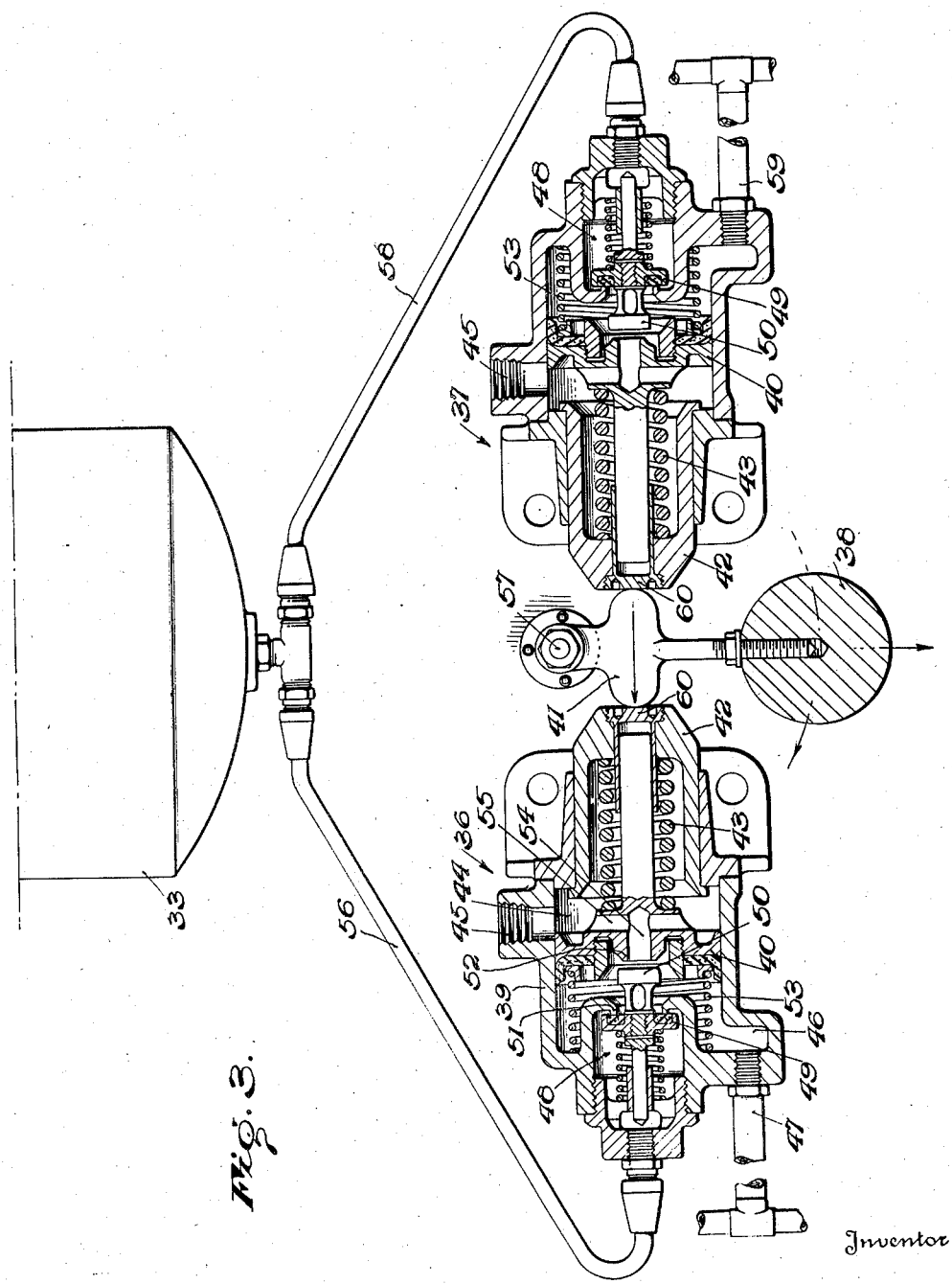

Patented Oct. 8, 1940

2,216,854

UNITED STATES PATENT OFFICE 2,216,854

VEHICLE SUSPENSION SYSTEM

Roy S. Sanford, New York, N. Y., assignor to Bendix-Westinghouse Automotive Air Brake Company, Pittsburgh, Pa., a corporation of Delaware Application July 3, 1936, Serial No. 88,889

20 Claims. (Cl. 152—416)

This invention relates to vehicle suspension systems and more particularly to systems of this type wherein the suspension devices comprise resilient pneumatic supports.

In order to improve the riding qualities of modern motor vehicles, it has heretofore been the usual practice to provide some type of flexible suspension system between the vehicle frame or body and the wheels thereof in order that the wheels may encounter irregularities in the contour of the road surface without immediately transmitting the full force of the corresponding shocks to the vehicle body. Such suspension systems have taken the form of springs or pneumatic devices for absorbing and dissipating some of the energy due to the road shocks, and in many instances, other shock absorbers of various types have been employed in an attempt to further control the dissipation of energy due to the road shocks. Due to the appreciable amount of the unsprung vehicle weight and other limitations present in the suspension systems heretofore employed, however, appreciable shocks have been imparted to the vehicle body and to the passengers therein, especially when the road contour over which the vehicle is to travel is exceedingly irregular.

It is accordingly one of the objects of the present invention to provide a vehicle suspension system wherein the unsprung vehicle weight is materially reduced and wherein the riding qualities of the vehicle are materially improved.

Another object is to provide a vehicle suspension system of the resilient type which shall be constituted in such a manner that the resiliency of the system will be automatically controlled in response to forces imparted to such system by irregularities in the road surface.

Still another object is to utilize the vehicle pneumatic tires as the suspension system and to automatically control the resiliency of the tires in such a manner as to substantially eliminate the transmission of road shocks from the suspension system to the vehicle body.

Another object is to provide, in a system of the above character, a novel construction wherein the inflation pressures of the vehicle tires are maintained substantially constant irrespective of tendencies of said pressures to increase due to road shocks imparted thereto, thereby providing a supporting force for the vehicle body of substantially constant magnitude and consequently reducing shocks on the vehicle body.

A further object is to improve the riding qualities of a motor vehicle when the latter deviates from a straight path, such as in making a turn, for example, in order to avoid lowering of the portion of the vehicle on the outside of the turn.

A still further object is to control the inflation pressures of the tires of a motor vehicle in such a manner that when the vehicle is turning, the pressure of the outside tires will be increased while the pressure of the inside tires will be reduced.

Another object is to so control the inflation pressures of the tires that the contact areas of all the tires with the road normally have a substantially constant value regardless of whether the vehicle is traveling along a straight or a curved path.

The above and other objects will appear more fully hereinafter from the following detailed description when taken in connection with the accompanying drawings illustrating one embodiment of the invention. It is to be expressly understood, however, that the drawings are utilized for purposes of illustration only and are not designed as a definition of the limits of the invention, reference being had for this purpose to the appended claims.

In the drawings, wherein similar reference characters refer to similar parts throughout the several views:

Fig. 3 is a view partly in section of the controlling valves operable, upon deviation of the vehicle from a straight path, for controlling the tire inflation pressures.

Figure 1:
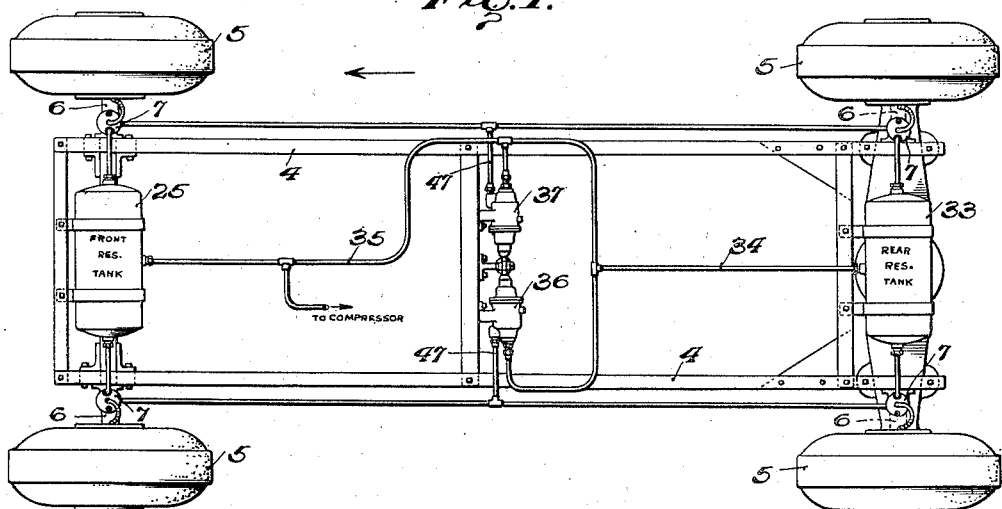
Fig. 1 is a diagrammatic plan view of a vehicle and suspension system therefor constructed in accordance with the principles of the present invention.
Figure 2:
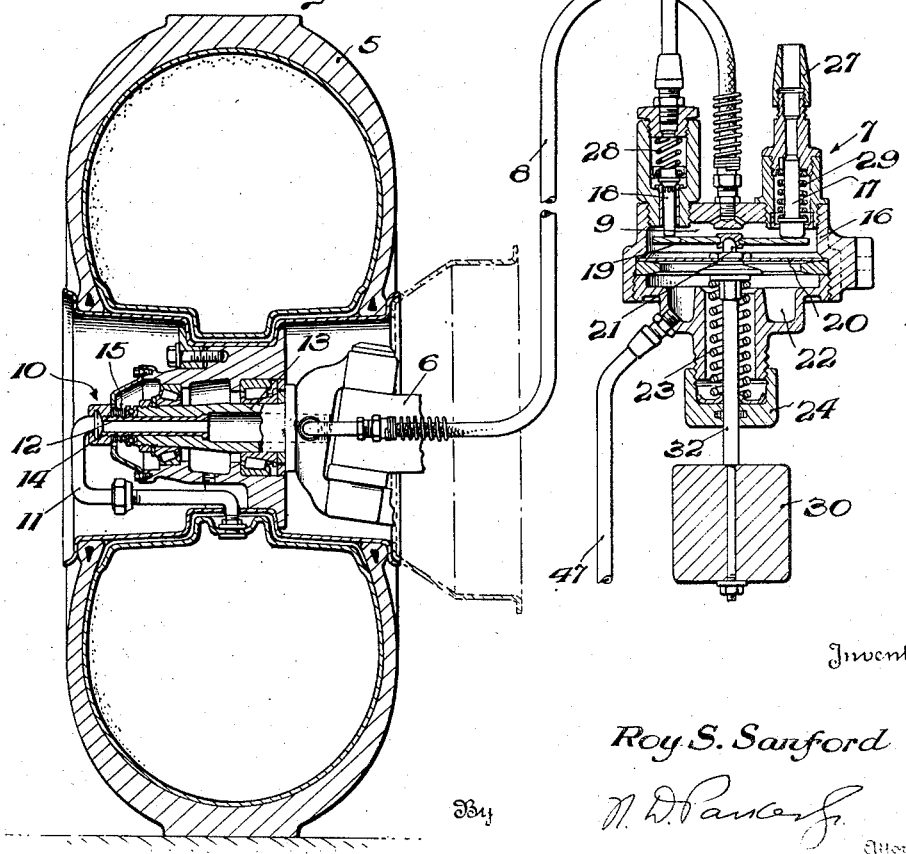
Fig. 2 is an axial sectional view of one of the front wheels and associated tire of a vehicle and illustrated in connection with the novel controlling valve mechanism for controlling the tire inflation pressures.

Referring more particularly to Fig. 1, the present invention is illustrated therein as embodying a vehicle frame 4 and resilient pneumatic suspension means 5 therefor, said suspension means comprising oversized pneumatic tires mounted upon wheels, which latter are directly connected to the vehicle frame through axles 6, the wheels at the left of the vehicle being pivotally mounted on axle 6 as more fully illustrated in Fig. 2 for steering the vehicle in a conventional manner through connections with a suitable steering gear, not shown. From the above described construction, it will be understood that portions of the tires 5 constitute the only unsprung portions of the vehicle.

During operation of vehicles equipped with pneumatic tires, it is well known that irregularities in road contour tend to vary the pressures within the tires, which variations in pressure are transmitted in part to the vehicle frame, thus subjecting the latter and vehicle body to shocks and jars which are extremely undesirable. For example, when the tire encounters a bump in the road, the area of contact between the tire and the road tends to increase, thereby reducing the interior volume of the tire and causing an accompanying rise in pressure therein. On the other hand, should the tire encounter a depression in the road, the area of contact between the tire and the road becomes less which tends to increase the volume of the tire with an accompanying decrease of inflation pressure. By the present invention, means are provided for substantially eliminating such changes in pressure within the pneumatic suspension devices which would otherwise, as heretofore pointed out, subject the vehicle body to injurious and undesirable shocks and jars.

In the form of the invention illustrated, see Fig. 2, such means is constituted in such a manner as to maintain substantially constant the inflation pressures of the tires to the end that a substantially constant supporting force for the vehicle frame will be secured irrespective of variations and irregularities in the road contour. As illustrated, such means comprises a pressure-regulating valve mechanism 7 which may be of any suitable form but is preferably constructed as shown in the patent to L. V. Lewis No. 1,533,322, dated April 14, 1925. The valve 7 is adapted to control the flow of fluid pressure to and from the tire 5 through conduit 8, one end of which is connected to a pressure chamber 9 of the valve and the other end of which is connected with the tire 5 through a suitable running joint 10. Such a joint comprises a conduit 11 connected at one end with the tire and at the other end with a sleeve 12 rotatably received by a hollow axle 13, there being interposed between the outer end of the axle and a cap 14 associated with one end of conduit 11, a spring 15 for urging the sleeve 12 outwardly in order to maintain a sealing engagement between this member and the axle 13. With the construction heretofore described, it will be readily perceived that conduit 8 is maintained in constant communication with the tire 5 irrespective of the fact that the latter rotates with respect to the vehicle frame.

The valve 7 more particularly includes a casing 16 housing exhaust and intake valves 17 and 18 respectively, said valves cooperating with an equalizing bar 19, the latter being associated at its center with a flexible diaphragm 20 through a diaphragm member 21 having a rounded end. The diaphragm 20 is so positioned within the casing 16 as to divide the same into the pressure chamber 9 and a diaphragm chamber 22, the latter containing a graduating spring 23 confined between an adjustable cap 24 and the diaphragm member 21. The intake valve 18 controls the flow of fluid pressure from a reservoir 25 to the pressure chamber 9 through conduit 26 and thence to the tire 5 via conduit 8. Exhaust valve 17, on the other hand, controls the connection between the pressure chamber 9 and the atmosphere through exhaust connection 27. Associated with the intake valve 18 is a spring 28 tending to maintain said valve closed at all times while a spring 29 associated with the exhaust valve 17 tends to maintain the latter valve open. Since the spring 28 is slightly stronger than the spring 29, upward movement of the diaphragm 20 will close the exhaust valve 17 prior to opening the intake valve 18. On the other hand, downward movement of diaphragm 20, as illustrated in Fig. 2, will permit closure of the intake valve 18 prior to opening of the exhaust valve 17. The above movements of the valves are enabled through the use of the equalizing beam 19.

From the aforementioned description, it will be apparent that the valve 7 is self-lapping and normally serves to maintain a predetermined pressure in the vehicle tire. Initially, the tension of the graduating spring 23 is adjusted by means of cap 24 in order to exert upon the diaphragm 20 a predetermined pressure in order to secure operation of the valve 7 and admit a predetermined pressure to the tire. As soon as the pressure within chamber 9 admitted through the intake valve 18 reaches a value substantially equal to the initial pressure imparted to the graduating spring 23, the diaphragm 20 is moved to the lapped position shown in Fig. 2, wherein both the intake and exhaust valves are closed. In the event of any slight leakage of air in the system between the valve and tire, the slight decrease in pressure within chamber 9 will enable the diaphragm 20 to be moved upwardly to restore the pressure in the system to the original value, the valvular apparatus thereby functioning to maintain in the vehicle tires a constant pneumatic pressure.

During operation of a vehicle equipped with the invention above described, irregularities of the road surface, as heretofore pointed out, tend to cause variations in the inflation pressure within the pneumatic suspension devices 5. In the event that a bump is encountered by the tire, the pressure therewithin will tend to rise. As soon as a rise in pressure has been initiated, the pressure within chamber 9 of the valve 7 will be slightly increased whereupon the balanced condition of the diaphragm 20 will be disturbed and the diaphragm moved downwardly a sufficient distance to enable the exhaust valve 17 to be slightly opened by its spring 29. The pressure within the tire 5 will thereupon be conducted through the running joint 10, conduit 8 and pressure chamber 9 to the atmospheric connection 27, past the open exhaust valve 17, a portion of the energy caused by the shock upon the tire being thus dissipated through exhausting of the fluid to atmosphere, the amount of fluid exhausted being directly proportional to the decrease in volume of the tire caused by the deflection of the tire due to the road irregularity. Thus, the pressure within the tire is maintained substantially constant throughout the period of shock and objectionable forces or jars are transmitted only partially from the tire to the vehicle body. As soon as the road obstruction or irregularity is past, the resiliency of the tire 5 tends to restore the volume thereof to its original capacity. This will tend to lower the unit pressure of the fluid within the tire which again affects the diaphragm 20 to unbalance the same. In this instance, however, the diaphragm is moved upwardly, as viewed in Fig. 2, to unseat the intake valve 18 and conduct fluid pressure to the tire 5 from reservoir 25 in order to maintain the pressure within the tire at the initial predetermined value irrespective of the increase in tire volume. Under any condition of tendency for volume change within the tire 5 to occur, the valve 7 is lapped or balanced as soon as the pressure changes above described have been completed by the automatic operation of the valve. Thus, the construction provided tends to automatically maintain the pressure within the pneumatic suspension devices substantially constant throughout all conditions of operation, and it is to be pointed out that the only actual pressure change that normally occurs within such suspension devices is that small differential necessary to cause initial operation of the diaphragm 20 for effecting control of either the exhaust valve 17 or the intake valve 18.

The above described control mechanism, however, dissipates only a portion of any shock imparted to the tire. For example, if the portion of a tire in contact with the road is considered as a piston of constant area regardless of deflection, it is evident that by the use of the control mechanism hereinbefore described, substantially all the energy due to a shock could be dissipated at constant pressure and the supporting force on the vehicle would be unchanged, with the result that practically no upward acceleration would be imparted to the vehicle body. It is evident then that the force of a road shock acting on the normal contact area of the tire will displace a certain amount of air through the control valve 7, thus dissipating a corresponding portion of the shock. If we now let a tire be deflected by road shock, it will be immediately apparent that the tire area in contact with the road will increase, and since it is a well established fact that the vehicle supporting force of a pneumatic tire is a function of road contact area and tire inflation pressure, it will be readily seen that with a tire deflected at constant pressure, the increase of contact area above normal will bring about a further upward force which is a function of the increased tire contact area and the constant tire pressure, and that this force will also tend to impart an upward acceleration to the body.

The present invention therefore provides, in addition to the above, a novel control for the pressure-regulating valve mechanism which is so constituted as to cooperate with said valve mechanism to cause dissipation of the additional shock energy imparted to the tire by the road as a result of its increase in contact area when deflected, and at a rate substantially equal to the rate of application of shock energy to the tire. As shown, Fig. 2, such means is responsive to accelerations and decelerations of the vehicle body in a vertical direction and includes an inertia-operated weight 30 secured to the diaphragm member 21 as by means of a rod 32, the latter being frictionally engaged by a ring 32a carried by the cap 24, the ring being of a rubber-like composition and adapted to prevent unwanted oscillations of the rod 32 and weight 30. Since the casing 16 of the valve 7 is attached to the vehicle body or sprung portion of the vehicle, it will be observed that the weight 30 is resiliently supported thereby through the agency of the graduating spring 23. With the addition of the weight 30 to the pressure-regulating valve mechanism, the operation of the latter in controlling the inflation pressure of the tires 5 is materially improved. For example and assuming that a road irregularity is encountered by the tire tending to increase the inflation pressure therein, it will be apparent that the initial rise in pressure within the tire tending to unbalance the diaphragm 20 for opening the exhaust valve 17 will be conveyed to the vehicle frame. This initial rise in pressure will move the frame upwardly slightly, and due to the inertia weight 30, the diaphragm 20 will be moved downwardly relative to the vehicle at a rapid rate and permit a substantially wide opening of the exhaust valve 17. This action enables the energy of shock in the form of excess fluid within the tire, by reason of the decreased volume, to be rapidly exhausted to atmosphere at a rate equal to the rate of application of shock to the tire. As soon as the initial shock is passed, the diaphragm 20 will be restored to its normal position through maintenance of the original predetermined pressure in the tire and return of the vehicle frame to its normal position.

On the other hand, if the tire should encounter a depression involving a slight and rapid lowering of the frame 4 and valve casing 16, the diaphragm 20 and associated weight would tend to remain stationary, the result being that the intake valve 18 would be widely opened in order to admit fluid pressure to the tire.

Although only one pressure-regulating valve has been above described, and that in connection with a front wheel of the vehicle, it will be understood that each of the tires 5 is provided with similar pressure-regulating valves, the corresponding valve 7 associated with the rear wheels being connected with a reservoir 33, connected to the reservoir 25 by conduits 34 and 35, said reservoirs being supplied with fluid under pressure from any suitable source on the vehicle, such as a compressor, not shown.

As heretofore pointed out, it has been found that when a vehicle deviates from a straight path of travel, such as when making a turn for example, there is an increased load upon the outside vehicle wheels due to the normal acceleration of the vehicle. This increased load tends to lower the side of the vehicle on the outside of the turn which is extremely undesirable, since it not only causes increased wear upon the tires, as well as increasing the difficulty of steering, but also gives rise to the possibility of the vehicle tipping over due to centrifugal forces developed when making turns at relatively high speeds. Moreover, with the vehicle equipped with the invention heretofore described, it will be apparent that the lowering of the vehicle frame on the outside of the turn would be increased due to the exhausting of air from the outside tires upon increase of load thereon due to the functioning of the inertia-controlled pressure-regulating valve mechanism. In order to compensate for the features heretofore mentioned and to moreover provide for increasing the inflation pressures of the outside tires when the vehicle deviates or turns, the present invention provides a control cooperating with the valvular mechanism heretofore described for slightly increasing the pressure of the outside tires in an amount proportional to the normal acceleration of the vehicle when turning.

As shown, such means is constituted by a pair of similar valve mechanisms 36 and 37, Fig. 3, for controlling the application of fluid pressure to the diaphragm chamber 22 of the valve 7, such valve mechanisms being supported by the vehicle frame and being controlled by a weight 38 also mounted upon the frame and constrained to movement in a direction laterally of the vehicle in response to the normal acceleration of the latter. Referring more particularly to Fig. 3, the valve mechanism 36 is of the self-lapping type and includes a casing 39 having a pressure-responsive element 40 therein operatively associated with a lever 41 by an actuating member 42, a graduating spring 43 being interposed between said actuating member and said pressure-responsive element. The latter divides the casing into an exhaust chamber 44 communicating with an exhaust opening 45, and an outlet chamber 46, the latter communicating through a conduit 47 with the pressure-regulating valve mechanisms disposed at the front and rear upon one side of the vehicle. Slidably mounted within the casing 39 is a valve assembly 48 providing intake and exhaust valves 49 and 50, the former cooperating with a seat 51 and the latter being adapted to contact a seat 52 carried by the element 40. With the parts in the position shown in Fig. 3, a spring 53 acts upon the element 40 in opposition to the action of the graduating spring 43 to maintain the element in such a position that the outlet chamber 46 is connected to the atmospheric port 45 through ducts 54 and 55. Movement of the member 42 to the left, as viewed in this figure, initially closes the exhaust valve 50 and subsequently opens the intake valve 49 in order to conduct fluid pressure from the reservoir 33 to the outlet chamber 46 through conduit 56. Fluid pressure is thereupon conducted through conduit 47 to each of the diaphragm chambers 22 of valves 7 positioned on one side of the vehicle. As soon as the pressure within the outlet chamber 46 reaches a value substantially equal to the pressure stored in the graduating spring 43 by reason of the initial movement of the member 42, the pressure-responsive element 40 will reach a balanced or lapped position wherein the intake valve 49 and the exhaust valve 50 are both closed. Any subsequent decrease in the tension of the graduating spring 43 will open the exhaust valve while any increase in the tension of said spring will open the intake valve to admit additional pressure to the outlet chamber.

Upon operation of the inertia-controlled device 38 to the left for example, as viewed in Fig. 3, which would occur when the vehicle deviated to the right of a straight path, the weight 38 and lever 41 will swing clockwise about a pivotal mounting 57 to effect operation of the valve 36. The consequent rise in pressure within diaphragm chambers 22 associated with pressure-regulating valve 7 upon the left side of the vehicle will cause an upward movement of the diaphragms 20, as will be obvious from an inspection of Fig. 2. Such control of the diaphragms will open intake valves 18 and admit fluid pressure to the tires 5 in order to increase the fluid pressure in the outside tires of the vehicle. The increase in pressure within said tires will be exactly proportional to the pressures supplied to the diaphragms 22 of the valve 7, which supplied pressures will in turn be proportional to the normal acceleration of the vehicle when turning and operative upon the controlling member 38. Thus, it will be readily apparent that upon making a turn to the right, for example, the inflation pressures of the outside vehicle tires will be increased in order to compensate for the increase in load upon said tires which would otherwise cause a deformation thereof and result in lowering of the outside part of the vehicle.

Since the valvular mechanism 37 is similar to the valve 36, the same will not be described in detail, it being sufficient to point out that said valve is connected to the reservoir 33 through a conduit 58 and controls the flow of fluid pressure to and from the valves positioned on the right side of the vehicle through a conduit 59.

While the centrifugally-controlled valves 36 and 37 function to control the pressure-regulating valves in such a manner as to increase inflation pressures of the outside tires when the load thereon increases due to turning, the valves 7 will nevertheless function to maintain a constant pressure within the outside tires irrespective of road irregularities encountered by said tires during the turn, except as such function is modified by the action of inertia weights 30. It will be understood, however, that the normal pressure will be maintained constant at a value determined by the normal acceleration of the vehicle when turning, and it will be readily understood that this pressure will be in excess of the normal pressure maintained in the tires when the vehicle is pursuing a straight path.

In certain instances, it may be desirable, in addition to raising the pressure of the outside tires of the vehicle when turning, to decrease slightly the pressures in the inside tires. This operation may be readily secured by the constructions heretofore described by merely adjusting threaded caps 60 positioned in the members 42 of the valves 36 and 37 to such a position that the pressure-responsive elements 40 are balanced or lapped when a slight pressure exists in the outlet chambers 46. Such pressures are conveyed to the diaphragm chambers 22 and normally aid the graduating springs 23 to provide the initial tension upon the lower faces of the diaphragms to secure the predetermined tire pressures desired. With such an arrangement, it will be obvious that as the acceleration control member 38 of Fig. 3 moves in one direction or the other in response to vehicle turning, one or the other valvular mechanisms 36 or 37 will be moved to exhaust position in order to vent to atmosphere the initial pressure conveyed to the particular pressure-regulating valves controlled thereby. Such exhausting of the pressure will relieve the fluid pressure normally existing below the diaphragms 20 of the said valves 7 with the result that the exhaust valves 17 of the valves 7 will open to permit a slight decrease in inflation pressures of the inside tires, and in the same manner, an increase of pressure will occur in the outside tires. The valves 7 will be balanced or lapped as soon as the resultant changed tire pressures reach a value as determined by the setting of the graduating springs 23 and by the pressures in diaphragm chambers 22.

While one embodiment of the invention has been shown and described herein with considerable particularity, it is to be understood that the invention is not limited thereto but is capable of a variety of expressions, as will now be readily apparent to those skilled in the art. Reference will therefore be had to the appended claims for a definition of the limits of the invention.

What is claimed is:

1. A resilient vehicle suspension system including pneumatic tires, and means including inertia control means responsive to vertical accelerations and decelerations of the vehicle for controlling the pressures in the tires.

2. A suspension system for vehicles including resilient means for supporting the vehicle, and inertia-controlled power means carried by the vehicle and operative to control the resiliency of the first named means in response to vertical accelerations or decelerations of the vehicle.

3. In a vehicle having a supporting system including pneumatic tires, a source of fluid pressure, and means independent of said supporting system and responsive to vertical accelerations and decelerations of the vehicle for controlling the flow of fluid from said source to the tires.

4. A vehicle supporting system including pneumatic tires, a source of fluid pressure on the vehicle, and means including an inertia-controlled member responsive to vertical accelerations and decelerations of the vehicle and operative to control the flow of fluid pressure between the source and the tires and between the latter and atmosphere.

5. A vehicle supporting system including a pneumatic tire, a source of fluid pressure on the vehicle, and means for maintaining the pressure in the tire substantially constant irrespective of variations in road contour, said means including connections between said source and said tire, said connections having pressure-regulating means associated therewith and embodying a pressure-responsive element subjected to the pressure of fluid within the tire, and inertia-controlled means associated with said element and responsive to vertical accelerations of the vehicle for modifying the action of said pressure regulating means to effect a quick release of fluid pressure from said tire.

6. A vehicle supporting system including pneumatic tires, a source of fluid pressure on the vehicle, conduits between said source and said tires, and valve means associated with said conduits and including an inertia-controlled valve actuating member responsive to road shocks for operating said valve for relieving pressures developed in said tires by road shocks, said pressures being in excess of a predetermined pressure.

7. In a vehicle having sprung and unsprung portions, said unsprung portion comprising a pneumatic tire, a source of fluid pressure on the vehicle, means including a valve for connecting said tire and source, and means including an inertia-operated control device responsive to road shocks and resiliently supported by the sprung portion of the vehicle for governing the operation of the valve.

8. A vehicle having steering means and comprising a body supported by a plurality of pneumatic tires, and means independent of the steering means and including inertia control means responsive to the normal acceleration of the vehicle when turning for controlling the pressures in some of said tires.

9. A vehicle having steering means and comprising a body supported by a plurality of pneumatic tires, valve means for controlling the flow of fluid pressure to said tires, and means independent of said steering means suspended from said body and constrained to move laterally thereof in response to a force determined by the degree of normal acceleration of the vehicle for controlling the operation of said valve means to increase the pressure of the fluid in the outside tires when the vehicle is turning.

10. A vehicle having steering means and a suspension system including a plurality of pneumatic supporting means, a source of fluid under pressure, and means independent of the steering means and including inertia control means responsive to the normal acceleration of the vehicle when turning to control the flow of fluid from said source to a portion of the supporting means.

11. A vehicle having steering means and a suspension system including a plurality of pneumatic supporting means, a source of fluid under pressure, means for conducting fluid from said source to the supporting means, and control means associated therewith including inertia control means independent of the steering means and responsive to the normal acceleration of the vehicle when deviating from a straight path to control the flow of fluid from the source to the supporting means on one side of the vehicle.

12. In a vehicle having steering means and a supporting system including pneumatic tires, a source of fluid under pressure carried by the vehicle, means for conducting fluid from said source to the tires including valvular control means associated with said conducting means, and means including a member independent of the steering means and actuated in response to centrifugal forces acting laterally of the vehicle and determined by the normal acceleration thereof when the latter deviates from a straight path for operating said valve means to increase the pressure in the outside tires of the vehicle.

13. A supporting system for vehicles including pneumatic tires, a source of fluid pressure, means for conducting fluid from said source to the tires including means responsive to vertical accelerations and decelerations of the vehicle, and means responsive to the normal acceleration of the vehicle when turning for controlling the operation of said second named means whereby the flow of fluid from the source to the tires may be controlled jointly by both of said responsive means.

14. A vehicle having steering means and a suspension system including a plurality of pneumatic supporting means, a source of fluid under pressure, means for conducting fluid from said source to the supporting means, and control means independent of the steering means carried by the vehicle and including inertia control means responsive to the normal acceleration of the vehicle when turning for controlling the flow of fluid from the source to the supporting means on one side of the vehicle and for releasing fluid from the supporting means on the other side of the vehicle.

15. A vehicle comprising a body supported by a plurality of pneumatic tires, steering means for turning the vehicle, valve means for controlling the flow of fluid pressure to said tires, and means independent of said steering means suspended from said body and movable laterally by centrifugal force acting thereon due to the vehicle turning for controlling the operation of said valve means to increase the pressure of the fluid in the outside tires of said vehicle.

16. A vehicle comprising a body supported by a plurality of pneumatic tires, and pressure control means including inertia control means responsive to the normal acceleration of the vehicle when turning for raising the pressures in the outer tires in a degree proportional to the magnitude of said force.

17. A resilient vehicle suspension system including a plurality of pneumatic tires, valve means for respectively controlling the inflation pressures in said tires, and inertia control means individually associated with said valve means and responsive to vertical accelerations and decelerations of the vehicle for controlling said valve means.

18. In a vehicle having a plurality of resilient devices for supporting the vehicle, power means carried by the vehicle and operative to control the resiliency of said devices, and inertia control means individually associated with said devices and responsive to vertical accelerations and decelerations of the vehicle for controlling the operation of said power means.

19. A vehicle supporting system including a plurality of pneumatic tires, a source of fluid pressure on the vehicle, and means for individually maintaining the pressures in the tires substantially constant irrespective of variations in road contour, said means including a connection between the source and each tire, each connection having pressure-regulating means associated therewith and embodying a pressure-responsive element subjected to the pressure of fluid within the corresponding tire, and inertia-controlled means associated with each of said elements and responsive to vertical accelerations of the vehicle for individually modifying the action of said pressure-regulating means to effect a quick release of fluid pressure from said tires.

20. A supporting system for vehicles including a plurality of pneumatic tires, a source of fluid pressure, means for individually conducting fluid from the source to each of the tires including means responsive to vertical accelerations and decelerations of the vehicle, and means responsive to the normal acceleration of the vehicle when turning for controlling the operation of said second named means whereby the flow of fluid from the source to the tires may be controlled jointly by both of said responsive means.

ROY S. SANFORD.